(12) United States Patent
Kasai

(10) Patent No.: US 9,632,393 B2
(45) Date of Patent: Apr. 25, 2017

(54) EXPOSURE CONTROLLER, EXPOSURE CONTROL METHOD, AND IMAGE PICKUP APPARATUS

(71) Applicant: Sony Corporation, Minato-ku (JP)

(72) Inventor: Daisuke Kasai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 67 days.

(21) Appl. No.: 14/319,244

(22) Filed: Jun. 30, 2014

(65) Prior Publication Data

US 2015/0062412 A1    Mar. 5, 2015

(30) Foreign Application Priority Data

Aug. 30, 2013 (JP) ................. 2013-179616

(51) Int. Cl.
| | |
|---|---|
| H04N 5/238 | (2006.01) |
| G03B 9/02 | (2006.01) |
| H04N 5/235 | (2006.01) |
| G03B 7/095 | (2006.01) |
| G03B 9/07 | (2006.01) |
| H04N 5/232 | (2006.01) |

(52) U.S. Cl.
CPC ............. *G03B 9/02* (2013.01); *G03B 7/095* (2013.01); *G03B 9/07* (2013.01); *H04N 5/238* (2013.01); *H04N 5/2353* (2013.01); *H04N 5/2354* (2013.01); *H04N 5/23209* (2013.01)

(58) Field of Classification Search
USPC ......................................... 348/363
See application file for complete search history.

(56) References Cited

U.S. PATENT DOCUMENTS

2002/0191076 A1 * 12/2002 Wada ................. G06K 9/00604
                                                                348/78
2012/0026360 A1 *  2/2012 Imamura ............ G02B 27/0075
                                                                348/229.1

FOREIGN PATENT DOCUMENTS

| JP | 62-059941 | 3/1987 |
|---|---|---|
| JP | 01-316726 | 12/1989 |
| JP | 4-124236 | 11/1992 |
| JP | 06-169428 | 6/1994 |
| JP | 2000-221558 | 8/2000 |
| JP | 2009-244622 | 10/2009 |
| JP | 2012-156807 | 8/2012 |

OTHER PUBLICATIONS

Japanese Office Action for JP 2013-179616 issued Jan. 10, 2017 (with English Translation).

* cited by examiner

*Primary Examiner* — Stephen Coleman
(74) *Attorney, Agent, or Firm* — Oblon, McClelland, Maier & Neustadt, L.L.P.

(57) ABSTRACT

An image processing apparatus, including circuitry configured to cause an aperture diaphragm to move from a first diaphragm position to a second diaphragm position within a first exposure period. The circuitry is further configured to cause the aperture diaphragm to then move from the second diaphragm position to the first diaphragm position within the first exposure period or a second exposure period. The first and second exposure periods are used to capture different images.

20 Claims, 12 Drawing Sheets

EXPOSURE CONTROLLER, EXPOSURE CONTROL METHOD, AND IMAGE PICKUP APPARATUS

CROSS REFERENCE TO RELATED APPLICATIONS

This application claims the benefit of Japanese Priority Patent Application JP 2013-179616 filed Aug. 30, 2013, the entire contents of which are incorporated herein by reference.

BACKGROUND

The present disclosure relates to an exposure controller, an exposure control method, and an image pickup apparatus that variably control an aperture stop to obtain apodization effect.

A method in which an apodization filter whose transmittance is high at a middle part thereof and is gradually decreased toward a peripheral region is provided in an entrance pupil of an optical system, to improve contrast of an image is known. In addition, there is a method in which an aperture stop is variably controlled to obtain an effect (apodization effect) similar to the effect of the apodization filter. For example, in Japanese Unexamined Patent Application Publication No. Hei10-333202 (FIG. 2), a method in which an aperture stop is stopped down to a preset initial value at the start of an exposure period, and is gradually released during the exposure to obtain apodization effect is proposed.

SUMMARY

In Japanese Unexamined Patent Application Publication No. Hei10-333202 (FIG. 2), however, a drive direction of the aperture stop is limited to a direction where the aperture stop is changed from a stopped-down state to a released state. Therefore, it is necessary to return the stop size of the aperture stop to a predetermined size for each shooting frame. Therefore, degradation in consecutive shooting speed may occur in performing consecutive shooting. Even in the case where shooting is not the consecutive shooting, it is necessary to return the stop size to the predetermined size after one frame is captured until next shooting is start, and thus preparation time until next shooting becomes possible takes long time.

It is desirable to provide an exposure controller, an exposure control method, and an image pickup apparatus that are capable of accelerating preliminary operation of an aperture stop at the time of obtaining apodization effect.

In a first aspect, an image processing apparatus includes circuitry configured to cause an aperture diaphragm to move from a first diaphragm position to a second diaphragm position within a first exposure period. The circuitry is further configured to cause the aperture diaphragm to then move from the second diaphragm position to the first diaphragm position within the first exposure period or a second exposure period. The first and second exposure periods are used to capture different images.

In another aspect, an image processing system includes an image processing system including circuitry configured to cause an aperture diaphragm to move from a first diaphragm position to a second diaphragm position within a first exposure period. The circuitry is further configured to cause the aperture diaphragm to then move from the second diaphragm position to the first diaphragm position within the first exposure period or a second exposure period. Each of the first and second exposure periods are used to capture different images In another aspect, a method of an image processing apparatus for image capture is provided. The method includes causing, by circuitry of the image processing apparatus, an aperture diaphragm to move from a first diaphragm position to a second diaphragm position within a first exposure period. The method further includes causing, by the circuitry, the aperture diaphragm to then move from the second diaphragm position to the first diaphragm position within the first exposure period or a second exposure period. The first and second exposure periods are used to capture different images.

In another aspect, a lens includes an aperture diaphragm and circuitry. The circuitry is configured to cause the aperture diaphragm to move from a first diaphragm position to a second diaphragm position within a first exposure period. The circuitry is further configured to cause the aperture diaphragm to then move from the second diaphragm position to the first diaphragm position within the first exposure period or a second exposure period. The first and second exposure periods are used to capture different images.

In another aspect, a method of an image processing apparatus for image capture is provided. The method includes causing, by circuitry of the image processing apparatus, an aperture diaphragm to move from a first diaphragm position to a second diaphragm position during an exposure period for capturing an image. The aperture diaphragm is positioned at an initial diaphragm position, which is close to a diaphragm end position of a previous exposure period for capturing a previous image, before the exposure period begins. The initial diaphragm position is closer to the first diaphragm position than the second diaphragm position.

In another aspect, an image processing apparatus includes circuitry configured to cause an aperture diaphragm to move from a first diaphragm position to a second diaphragm position during an exposure period for capturing an image. The aperture diaphragm is positioned at an initial diaphragm position, which is close to a diaphragm end position of a previous exposure period for capturing a previous image, before the exposure period begins. The initial diaphragm position is closer to the first diaphragm position than the second diaphragm position

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
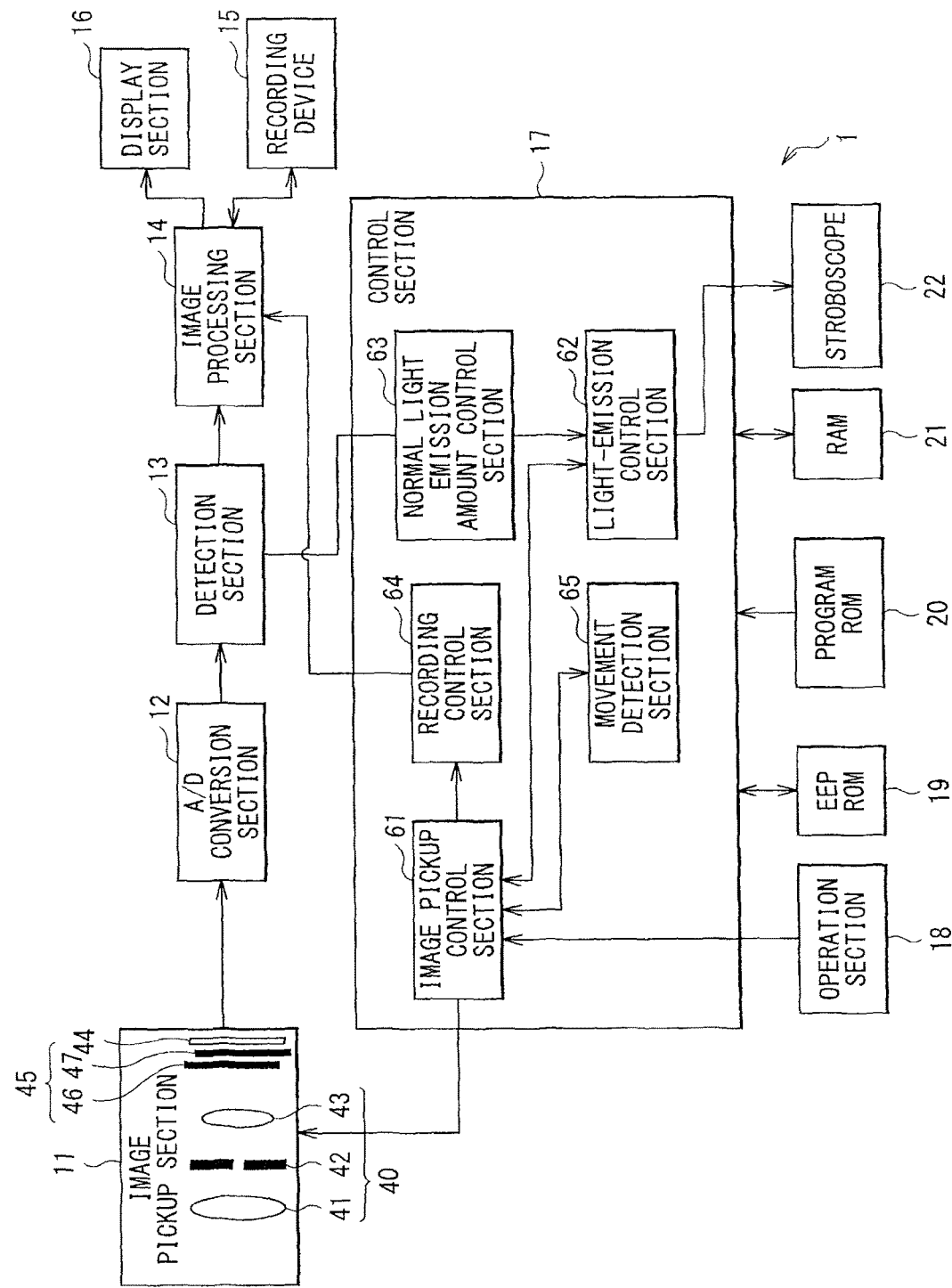
FIG. 1 is a block diagram illustrating an example of a general configuration of an image pickup apparatus according to a first embodiment of the disclosure.

Hereinafter, some embodiments of the disclosure will be described in detail with reference to drawings. Note that description will be given in the following order.

1. First embodiment (a first example of exposure control)
1.1 Configuration
1.2 Operation
1.3 Effects
1.4 Modification of first embodiment
2. Second embodiment (a second example of exposure control)
2.1 Control operation of aperture stop
2.2 Control operation of exposure timing
2.3 Effects
3. Third embodiment (an example of light-emission control)
3.1 Operation of light-emission control
3.2 Effects
4. Other embodiments 1. First Embodiment 1.1 Configuration of Image Pickup Apparatus (General Configuration of Image Pickup Apparatus)

FIG. 1 illustrates an example of a general configuration of an image pickup apparatus 1 according to a first embodiment of the disclosure.

The image pickup apparatus 1 includes an image pickup section 11, an analog-to-digital (A/D) conversion section 12, a detection section 13, an image processing section 14, a recording device 15, a display section 16, and a control section 17. In addition, the image pickup apparatus 1 includes an operation section 18, an electrically erasable programmable read-only memory (EEPROM) 19, a program read only memory (ROM) 20, a random access memory (RAM) 21, and a stroboscope 22.

The control section 17 includes an image pickup control section 61, a light-emission control section 62, a normal light-emission amount control section 63, a recording control section 64, and a movement detection section 65. The image pickup section 11 includes a lens section 40, an image pickup device 44, and a shutter 45.

The lens section 40 is an image pickup optical system forming an optical image of an object that is captured by the image pickup device 44. The lens section 40 includes a plurality of lenses 41 and 43, and an aperture stop 42. The image pickup apparatus 1 may be a lens interchangeable type camera. In the case of the lens interchangeable type camera, the lens section 40 may be detachable and interchangeable. One or both of the plurality of lenses 41 and 43 may be movable for focus adjustment and zooming.

The shutter 45 is disposed between the lens section 40 and the image pickup device 44. The shutter 45 may be, for example, a mechanical shutter of focal plane system, and includes a front curtain 46 and a rear curtain 47.

The image pickup device 44 outputs an electric signal corresponding to the optical image formed on an imaging surface by the lens section 40, and is configured of a solid-state image pickup device such as a CMOS and a charge coupled device (CCD). In the image pickup device 44, a plurality of pixels each including a photoelectric conversion element that converts light into an electric signal and then outputs the electric signal are two-dimensionally arranged.

The A/D conversion section 12 performs various kinds of signal processing on an output signal from the image pickup device 44 to generate a digital image signal. The detection circuit 13 detects a signal value of the image signal. The image processing section 14 performs various kinds of signal processing to convert the image signal into image data suitable for being recorded in the recording device 15 and outputs the image data. The image processing section 14 also performs various kinds of single processing to convert the image signal to image data suitable for being displayed on the display section 16 and outputs the image data.

The recording device 15 records the image data obtained by shooting. The display section 16 displays an operation menu and the like of the image pickup apparatus 1, and to reproduce and display the image data that is recorded in the recording device 15, in a reproduction mode. The display section 16 also performs live display of an image in shooting in a live view mode.

The operation section 18 includes a release button, various kinds of operation switches, an operation dial, and the like, and supplies various kinds of operation signals to the image pickup control section 61 in the control section 17 in response to operation contents by a user.

The control section 17 performs general control of respective sections in the image pickup apparatus, and includes a central processing unit (CPU). The control section 17 executes control program that is previously stored in the program ROM 20 to perform the general control of the respective sections. The RAM 21 temporarily holds various kinds of data. The EEPROM 19 is a rewritable non-volatile memory, and may hold, for example, various kinds of setting information and the like.

The image pickup control section 61 causes each section of the control section 17 to perform control operation based on the operation signal from the operation section 18, and causes the image pickup section 11 to perform drive control of each section. The light-emission control section 62 and the normal light-emission amount control section 63 perform light-emission control of the stroboscope 22. The recording control section 64 performs control relating to recording of the image data to the recording device 15. The movement detection section 65 detects the movement and the like of the lens section 40 that moves for the focus adjustment and the zooming.

(Configuration of Drive Control Section of Exposure System)

Figure 2:
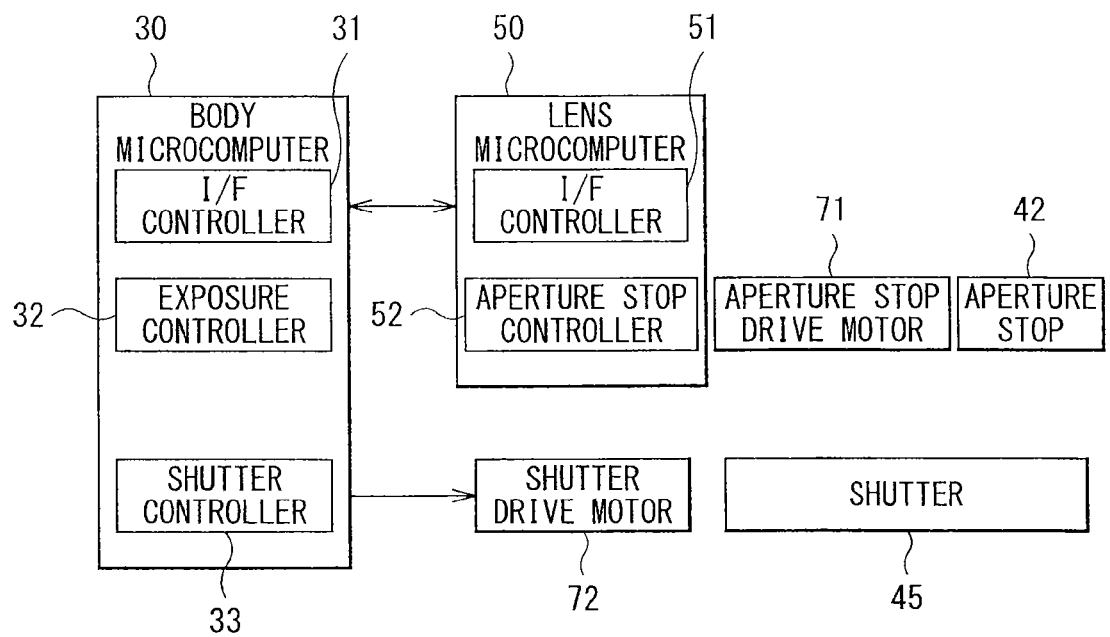
FIG. 2 is a block diagram illustrating a configuration example of a drive control section of an exposure system in the image pickup apparatus.

FIG. 2 illustrates a configuration example of a drive control section of an exposure system in the image pickup apparatus 1. FIG. 2 illustrates a configuration example in a case where the image pickup apparatus 1 is a lens interchangeable type camera. As illustrated in FIG. 2, the image pickup apparatus 1 may include a body microcomputer 30 on a camera body side, and a lens microcomputer 50 on the lens section 40 side. The body microcomputer 30 may includes an interface (I/F) controller 31, and an exposure controller 32 and a shutter controller 33 as an exposure control section. The lens microcomputer 50 may include an I/F controller 51, and an aperture-stop controller 52 as an aperture-stop control section.

The aperture-stop controller 52 variably controls a stop size of the aperture stop 42 through an aperture-stop drive motor 71. The stop size of the aperture stop 42 corresponds to a degree of stop down of the aperture stop 42. The shutter controller 33 controls open and close of the shutter 45 through a shutter drive motor 72. As the aperture-stop drive motor 71, for example a stepping motor may be used.

Figure 3:
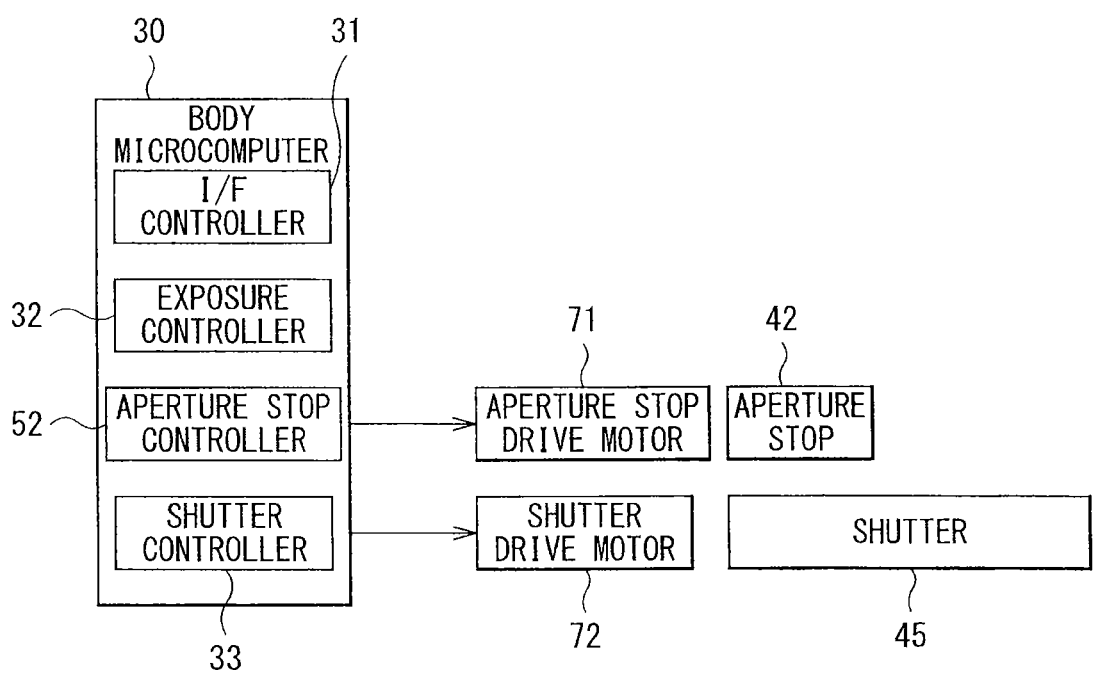
FIG. 3 is a block diagram illustrating another configuration example of the drive control section of the exposure system in the image pickup apparatus.

FIG. 3 illustrates another configuration example of the drive control section of the exposure system in the image pickup apparatus 1. FIG. 3 illustrates the configuration example in a case where the image pickup apparatus 1 is a lens integrated type camera. In the case of the lens integrated type camera, the lens microcomputer 50 in FIG. 2 may be omitted. As illustrated in FIG. 3, the aperture-stop controller 52 may be provided in the body microcomputer 30.

1.2 Operation (Operation of Entire Image Pickup Apparatus)

In the image pickup apparatus 1 illustrated in FIG. 1, light that has entered the lens section 40 from an object forms an image on the imaging surface of the image pickup device 44. The electric signal that is converted from the light by the image pickup device 44 is input as the image signal to the image processing section 14 through the A/D conversion section 12 and the detection section 13. The image processing section 14 converts the image signal into a compressed image file typified by JPEG after performing processing such as gradation adjustment, color tone adjustment, noise reduction processing, and size conversion, on the image signal, and stores the compressed image file as the image data in the recording device 15. Moreover, the image data output from the image processing section 14 is displayed on the display section 16 after being composite with operation icons, shooting information, etc. by a display processing section (not illustrated). Further, the image pickup control section 61 appropriately outputs necessary instruction signals to the image pickup section 11, the light-emission control section 62, the recording control section 64, and the like, in response to user operation through the release button, the operation switches, and the like on the operation section 18.

(Operation Relating to Exposure Control)

Next, with reference to FIG. 4 to FIG. 6 further, operation relating to the exposure control will be described.

Figure 4:
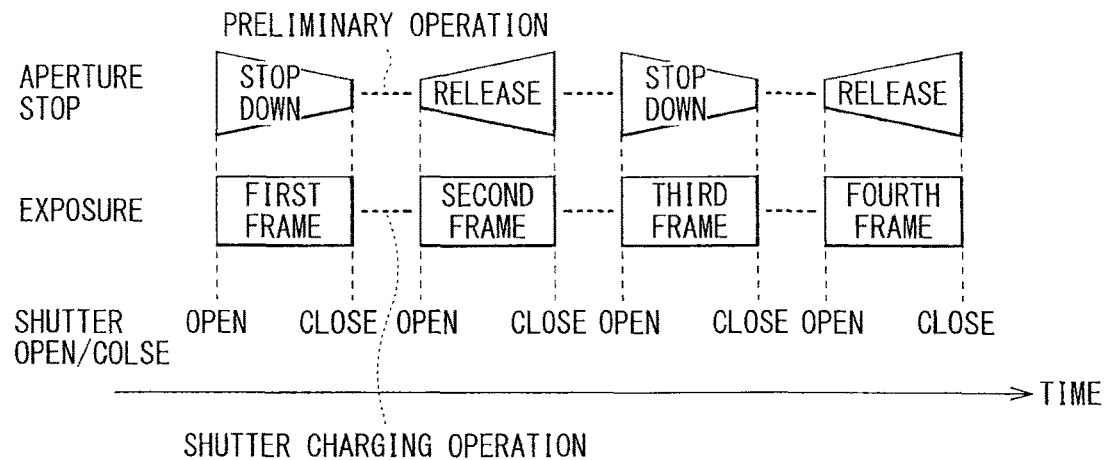
FIG. 4 is an explanatory diagram illustrating a first example of control of an aperture stop in the image pickup apparatus according to the first embodiment.

FIG. 4 illustrates a first example of control of the aperture stop 42 in the first embodiment. FIG. 5 illustrates a second example of the control of the aperture stop 42. FIG. 6 illustrates an example of a flow of the control of the aperture stop 42.

Figure 5:
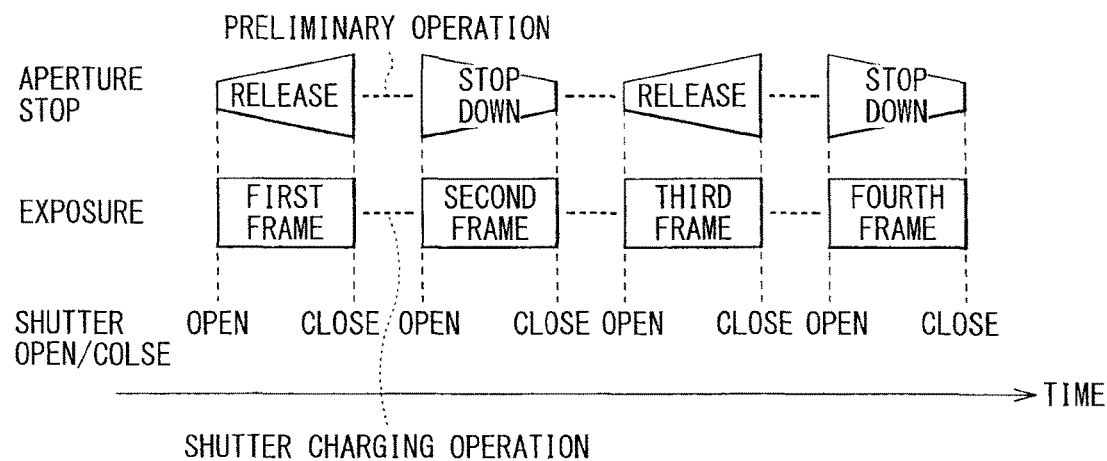
FIG. 5 is an explanatory diagram illustrating a second example of the control of the aperture stop in the image pickup apparatus according to the first embodiment.

In FIG. 4 and FIG. 5, a stop size of the aperture stop 42 and open and close operation of the shutter 45 for each frame in performing consecutive shooting are illustrated. Note that the open and close operation of the shutter 45 is controlled by the exposure controller 32 and the shutter controller 33 illustrated in FIG. 2 or FIG. 3. The stop size of the aperture stop 42 is controlled by the aperture-stop controller 52 illustrated in FIG. 2 or FIG. 3.

The aperture-stop controller 52 variably controls the aperture stop 42 between a first stop size and a second stop size during exposure. The second stop size is different from the first stop size. The aperture-stop controller 52 controls the mode of the aperture stop 42 to alternate between a first change mode and a second change mode, for each frame, in performing consecutive shooting. In the first change mode, the aperture-stop controller 52 sets the stop size at the exposure start to the first stop size, and changes the stop size at the exposure end to the second stop size. In the second change mode, the aperture-stop controller 52 sets the stop size at the exposure start to the second stop size, and changes the stop size at the exposure end to the first stop size. In addition, the aperture-stop controller 52 causes the aperture stop 42 to perform preliminary operation to change the stop size, in matching with the shutter charging operation between frames.

In this example, as for FIG. 4 and FIG. 5, description will be given by assuming that the first stop size is a size released more than the second stop size, the first change mode is a mode where a degree of stop down of the aperture stop is changed in a stop-down direction, and the second change mode is a mode where a degree of stop down of the aperture stop is changed in a releasing direction.

Specifically, in the example of FIG. 4, the degree of the stop-down of the aperture stop 42 is changed in the stop-down direction while a first frame of the consecutive shooting is assumed in the first change mode. In addition, the degree of the stop-down of the aperture stop 42 is changed in the releasing direction while a second frame is assumed in the second change mode. In the following, such operation is alternately repeated in the consecutive shooting.

In the example of FIG. 5, the degree of the stop down of the aperture stop 42 is changed in the releasing direction while the first frame of the consecutive shooting is assumed in the second change mode. In addition, the degree of the stop down of the aperture stop 42 is changed in the stop-down direction while the second frame is assumed in the first change mode. In the following, such operation is alternately repeated in the consecutive shooting.

Since the stop size at the exposure end is the same as the stop size at the exposure start between frames by performing the operation illustrated in FIG. 4 or FIG. 5, it is possible to minimize the preliminary operation between frames in the consecutive shooting, which contributes to acceleration of the consecutive shooting speed.

Here, whether the first frame of the consecutive shooting is changed in the stop-down direction as illustrated in FIG. 4 or is changed in the releasing direction as illustrated in FIG. 5 is controlled in the following manner.

Before the consecutive shooting is performed, the aperture-stop controller 52 determines whether the current stop size of the aperture stop 42 is close to either the first stop size or the second stop size, and controls the aperture stop 42 under the first frame in the consecutive shooting to operate either in the first change mode or in the second change mode based on a determination result. When the current stop size before the consecutive shooting is close to the first stop size, the aperture-stop controller 52 performs control so that the mode of the aperture stop 42 under the first frame is put into the first change mode, and when the current stop size is close to the second stop size, the aperture-stop controller 52 performs control so that the mode of the aperture stop 42 under the first frame is put into the second change mode. Specifically, the aperture-stop controller 52 performs control illustrated in FIG. 6.

Figure 6:
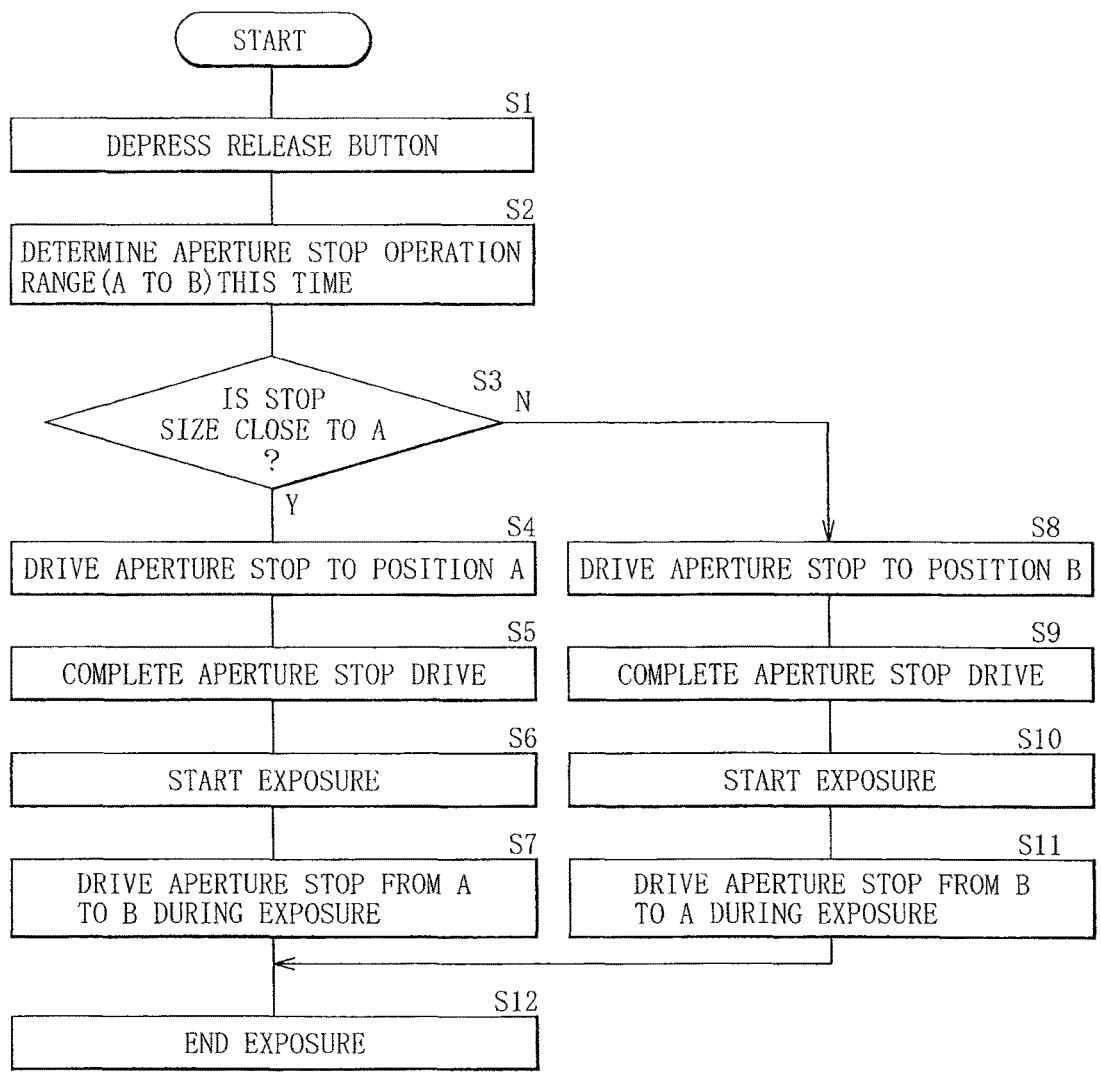
FIG. 6 is a flowchart illustrating an example of the control of the aperture stop in the image pickup apparatus according to the first embodiment.

FIG. 6 illustrates an example of control operation of the aperture stop 42 for the first frame. When the release button of the operation section 18 is depressed (step S1), the image pickup apparatus 1 determines an aperture stop operation range this time based on the shooting condition (step S2). Here, the first stop size is denoted by A, and the second stop size is denoted by B. Next, the aperture-stop controller 52 determines whether the current stop size of the aperture stop 42 is close to either the first stop size A or the second stop size B (step S3). When the current stop size is close to the first stop size A (step S3; Y), the aperture-stop controller 52 drives the aperture-stop drive motor 71 so that the aperture stop 42 is moved to the first stop size A (step S4). After the aperture stop 42 is moved to the first stop size A (step S5), the shutter 45 is driven by the exposure controller 32 and the shutter controller 33, and then the exposure is started (step S6). The aperture-stop controller 52 drives the aperture-stop drive motor 71 so that the stop size is changed from the first stop size A to the second stop size B during the exposure (step S7). The exposure controller 32 and the shutter controller 33 close the shutter 45 at the exposure end time, and the first exposure is ended (step S12).

On the other hand, when the current stop size is close to the second stop size B (step S3; N), the aperture-stop controller 52 drives the aperture-stop drive motor 71 so that the aperture stop 42 is moved to the second stop size B (step S8). After the aperture stop 42 is moved to the second stop size B (step S9), the shutter 45 is driven by the exposure controller 32 and the shutter controller 33, and then the exposure is started (step S10). The aperture-stop controller 52 drives the aperture-stop drive motor 71 so that the stop size is changed from the second stop size B to the first stop size A during the exposure (step S11). The exposure controller 32 and the shutter controller 33 close the shutter 45 at the exposure end time, and the first exposure is ended (step S12).

As described above, the control in which a stopping-down start size of the first frame and the drive direction are dynamically changed is performed so that the previous amount of aperture stop driving is as small as possible based on the stop size before release start of the first frame. As a result, release time lag is allowed to be reduced.

1.3 Effects

As described above, according to the first embodiment, the mode of the aperture stop 42 is controlled to alternate between the first change mode and the second change mode for each frame in performing the consecutive shooting. Therefore, it is possible to accelerate the preliminary operation of the aperture stop 42 at the time of obtaining apodization effect. As a result, it is possible to increase consecutive shooting speed. Moreover, since, out of the range where it is necessary for the aperture stop 42 to move in order to obtain apodization effect in shooting, a size close to the stop size immediately before the shooting is set as the aperture-stop driving start size, the release time lag is allowed to be minimized.

Note that the effects described in the present specification are merely examples without limitation, and other effects may be obtained. The same applies to the following other embodiments and modifications.

1.4 Modification of First Embodiment

Figure 7:
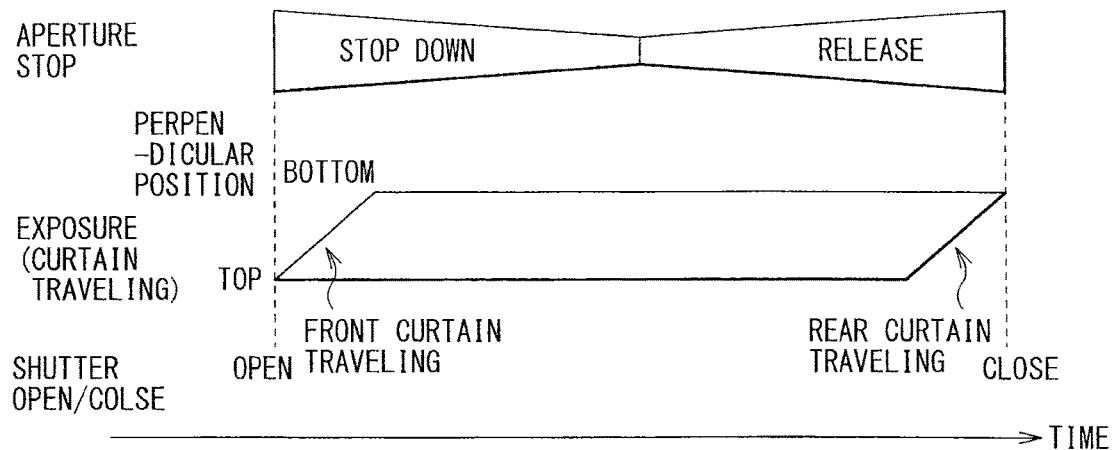
FIG. 7 is an explanatory diagram illustrating a first example of control of an aperture stop in an image pickup apparatus according to a modification of the first embodiment.
Figure 8:
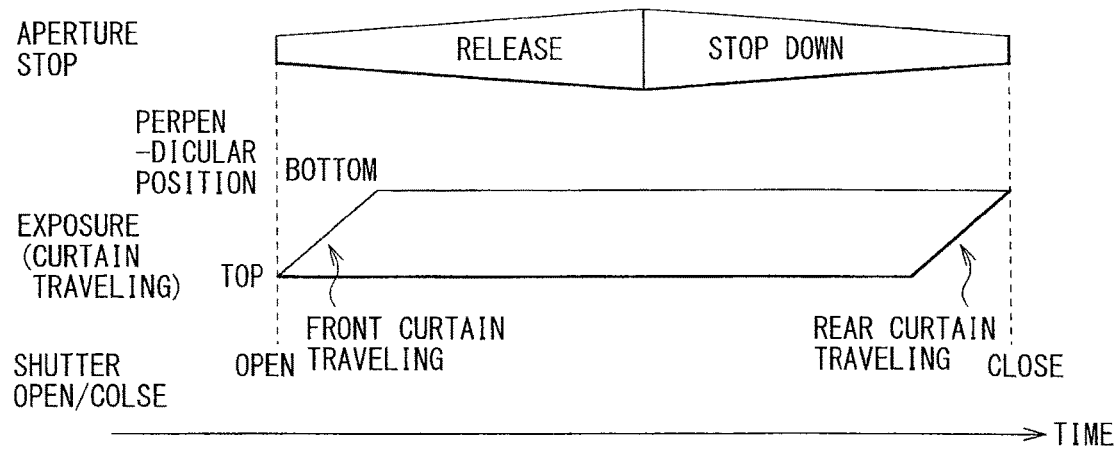
FIG. 8 is an explanatory diagram illustrating a second example of the control of the aperture stop in the image pickup apparatus according to the modification of the first embodiment.
Figure 9:
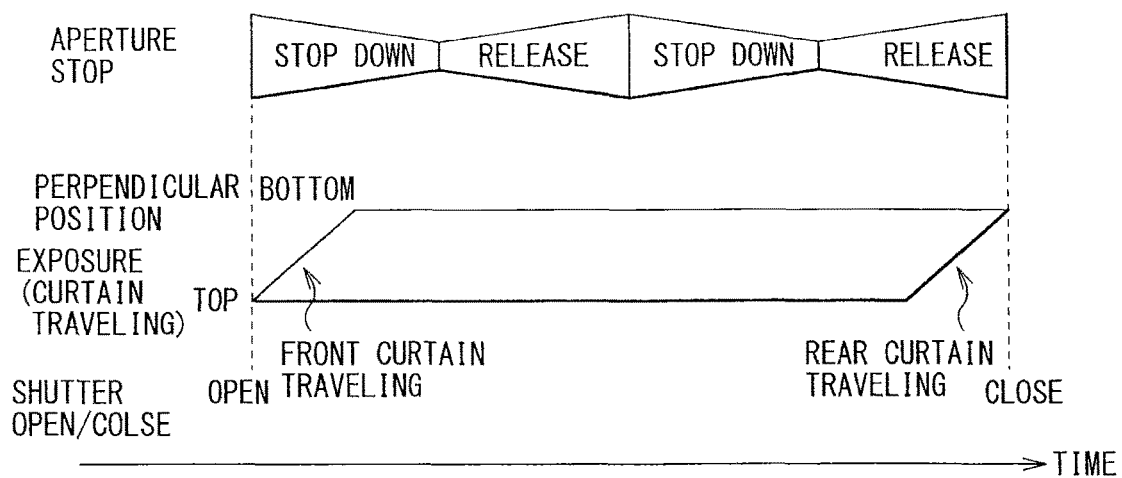
FIG. 9 is an explanatory diagram illustrating a third example of the control of the aperture stop in the image pickup apparatus according to the modification of the first embodiment.
Figure 10:
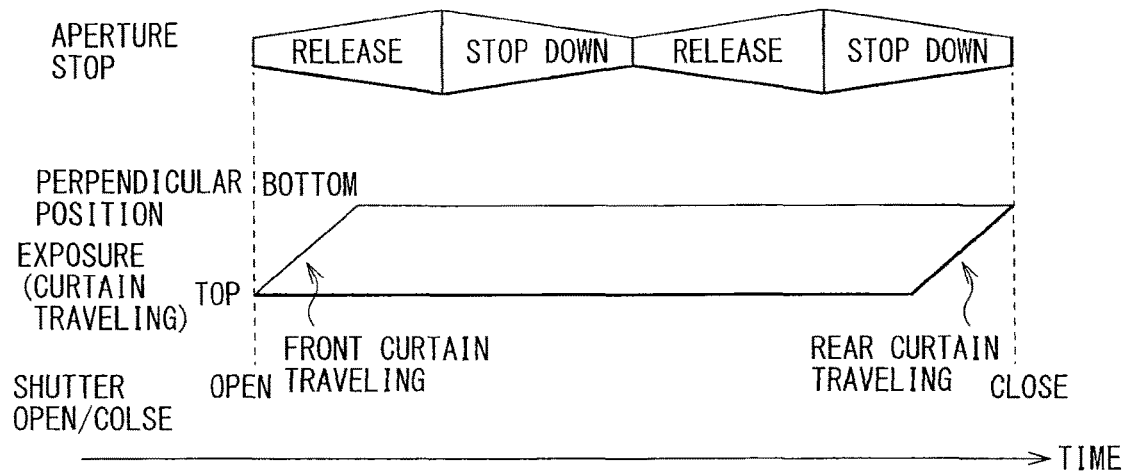
FIG. 10 is an explanatory diagram illustrating a fourth example of the control of the aperture stop in the image pickup apparatus according to the modification of the first embodiment.
Figure 11:
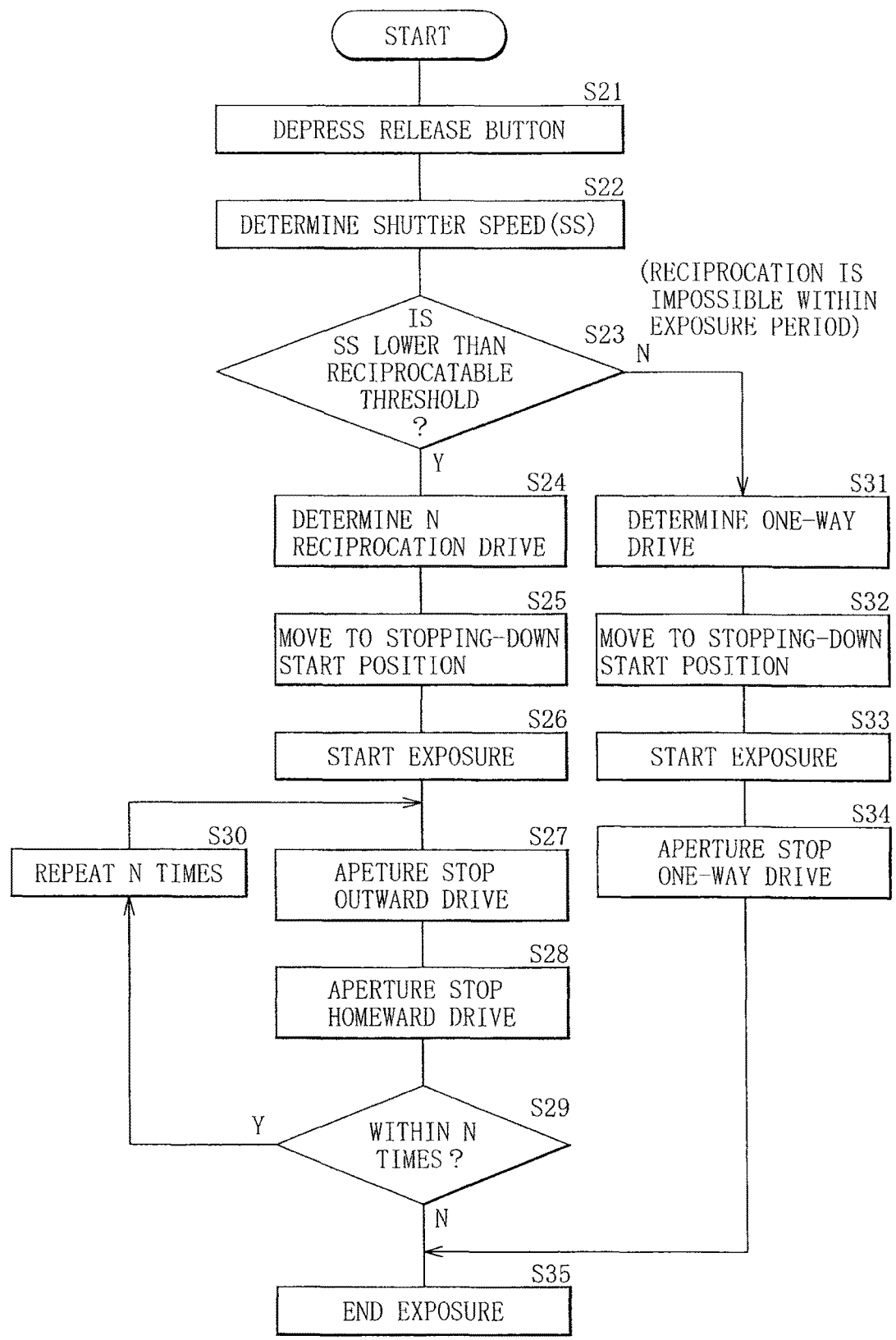
FIG. 11 is a flowchart illustrating an example of the control of the aperture stop in the image pickup apparatus according to the modification of the first embodiment.

Next, with reference to FIG. 7 to FIG. 11 further, a modification of the first embodiment will be described for the exposure control. FIG. 7 illustrates a first example of control of the aperture stop 42 in the modification. FIG. 8 illustrates a second example of the control of the aperture stop 42 in the modification. FIG. 9 illustrates a third example of the control of the aperture stop 42 in the modification. FIG. 10 illustrates a fourth example of the control of the aperture stop 42 in the modification. FIG. 11 illustrates an example of a flow of the control of the aperture stop 42 in the modification.

In FIG. 7 to FIG. 10, the stop size of the aperture stop 42 and the open and close operation of the shutter 45 within a single exposure period in shooting are illustrated. The shutter 45 is a mechanical shutter of focal plane system. In the middle part of each of FIG. 7 to FIG. 10, a state of curtain travelling including a travelling state of the front curtain 46 and a travelling state of the rear curtain 47 is illustrated.

In the case where the mechanical shutter of the focal plane system is used for exposure, since time of several msec is necessary for the travelling of the mechanical shutter, exposure timings are different between the top part and the bottom part of the imaging surface, as illustrated in the middle part of each of FIG. 7 to FIG. 10. Therefore, when the degree of the stop down of the aperture stop 42 is simply changed in one direction during exposure, exposure unevenness of brightness may occur in the top part and the bottom part of the picked-up image in some cases. In the present modification, to suppress such exposure unevenness, control of alternately reciprocating the aperture stop 42 N times (N is an integer of 1 or more) is performed while one frame is captured (within a single exposure period). Accordingly, it is possible to prevent exposure unevenness occurring due to difference of the stop size between the top part and the bottom part of the imaging surface.

In the present modification, the aperture-stop controller 52 controls the mode of the aperture stop 42 to alternate between the first change mode and the second change mode, N times within a single exposure period. N is an integer of 1 or more, and the aperture-stop controller 52 controls the mode of the aperture stop 42 to alternate between the first change mode and the second change mode, one or more times within a single exposure period. In the first change mode, the aperture-stop controller 52 sets the initial stop size to the first stop size, and changes the end stop size to the second stop size. In the second change mode, the aperture-stop controller 52 sets the initial stop size to the second stop size, and changes the end stop size to the first stop size.

In this example, as for FIG. 7 and FIG. 9, description will be given by assuming that the first stop size is a size released more than the second stop size, the first change mode is a mode where the degree of the stop down of the aperture stop is changed in the stop-down direction, and the second change mode is a mode where the degree of the stop down of the aperture stop is changed in the releasing direction. In contrast, as for FIG. 8 and FIG. 10, description will be given by assuming that the first stop size is a size stopped down more than the second stop size, the first change mode is a mode where the degree of the stop down of the aperture stop is changed in the releasing direction, and the second change mode is a mode where the degree of the stop down of the aperture stop is changed in the stop-down direction.

As a specific example, in the example of FIG. 7, a mode in a first half within a single exposure period is set to the first change mode, and the degree of the stop down of the aperture stop 42 is changed in the stop-down direction. In addition, a mode in a latter half is set to the second change mode, and the degree of the stop down of the aperture stop 42 is changed in the releasing direction. In FIG. 9, an example in which such control is repeated twice within a single exposure period is illustrated.

In the example of FIG. 8, a mode in the first half within a single exposure period is set to the first change mode, and the degree of the stop down of the aperture stop 42 is changed in the releasing direction. In addition, a mode in the latter half is set to the second change mode, and the degree of the stop down of the aperture stop 42 is changed in the stop-down direction. In FIG. 10, an example in which such control is repeated twice within a single exposure period is illustrated.

The aperture-stop controller 52 may dynamically determine whether the aperture-stop control in which the aperture stop is reciprocated as illustrated in FIG. 7 to FIG. 10 is performed, based on the shutter speed. When the aperture-stop control as illustrated in FIG. 7 to FIG. 10 is performed, the drive distance of the aperture stop is twice or more than the normal drive distance of the aperture stop. Therefore, when the shutter speed is high (a single exposure period is short), the reciprocation drive of the aperture stop as illustrated in FIG. 7 to FIG. 10 may not be performed in some cases. In such a case, one-way drive in which the degree of the stop down of the aperture stop is changed in one direction (in the releasing direction or in the stop-down direction) is performed. An example of performing such determination is described with reference to FIG. 11.

When the release button of the operation section 18 is depressed (step S21), the image pickup apparatus 1 determines the shutter speed (SS) based on the shooting condition (step S22). The aperture-stop controller 52 determines whether the shutter speed (SS) is lower than a predetermined threshold that allows the aperture stop to be reciprocated (step S23). When the shutter speed (SS) is not lower than the predetermined threshold (step S23; N), the reciprocation drive of the aperture stop is not performed within a single exposure period, and thus the aperture-stop controller 52 determines to perform one-way drive (step S31). The aperture-stop controller 52 drives the aperture-stop drive motor 71 to adjust the stop size of the aperture stop 42 to the predetermined start size (step S32). After that, the shutter 45 is driven by the exposure controller 32 and the shutter controller 33, and the exposure is started (step S33). The aperture-stop controller 52 causes the aperture-stop drive motor 71 to perform one-way drive in which the degree of the stop down of the aperture stop is changed in one direction, during the exposure (step S34). When the exposure end time comes, the exposure controller 32 and the shutter controller 33 close the shutter 45 to end the exposure (step S35).

On the other hand, when the shutter speed (SS) is lower than the predetermined threshold (step S23; Y), the reciprocation drive of the aperture stop is performable within a single exposure period, and thus the aperture-stop controller 52 determines to perform the reciprocation drive (step S24). The aperture-stop controller 52 drives the aperture-stop drive motor 71 to adjust the stop size to be the predetermined start size (step S25). After that, the shutter 45 is driven by the exposure controller 32 and the shutter controller 33, and the exposure is started (step S26). The aperture-stop controller 52 causes the aperture-stop drive motor 71 to perform reciprocation drive of the aperture stop so that the mode of the aperture stop is put into the first change mode in an outward movement, and the mode of the aperture stop is put into the second change mode in a homeward movement (steps S27 and S28). The aperture-stop controller 52 repeats such reciprocation drive N times (step S29; Y, and step S30). When the exposure end time comes after the reciprocation drive is performed N times (step S29; N), the exposure controller 32 and the shutter controller 33 close the shutter 45 to end the exposure (step S35).

According to the present modification, the mode of the aperture stop 42 is controlled to alternate between the first change mode and the second change mode one or more times within a single exposure period. Therefore, it is possible to accelerate the preliminary operation of the aperture stop 42 at the time of obtaining apodization effect. Further, it is possible to reduce exposure unevenness at the time of performing the exposure by the focal plane shutter.

2. Second Embodiment 2.1 Control Operation of Aperture Stop

With reference to FIG. 12 to FIG. 15, control operation of the aperture stop according to a second embodiment is described. Note that the basic configurations of the entire image pickup apparatus and the drive control section of the exposure system according to the second embodiment may be similar to those in the above-described first embodiment (FIG. 1 to FIG. 3).

Figure 12:
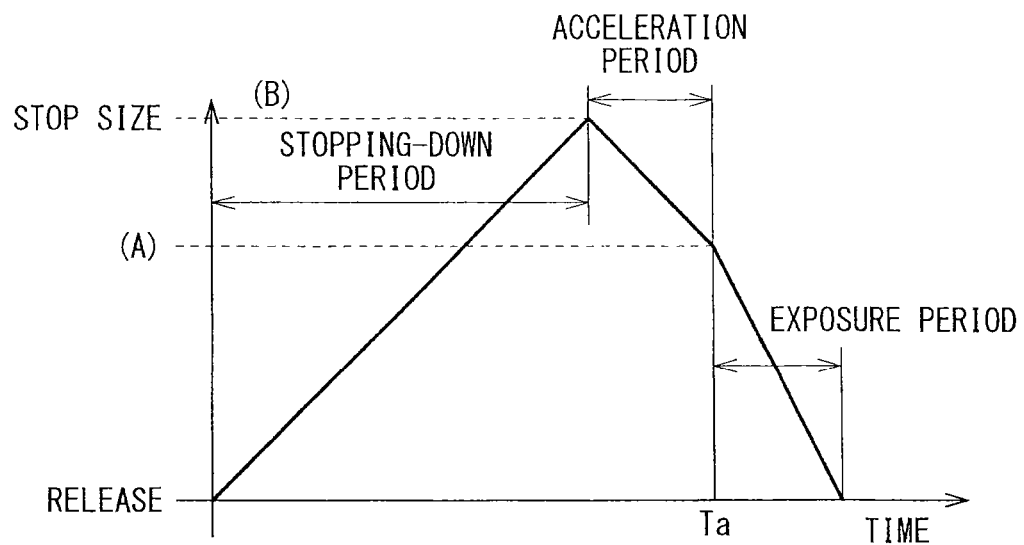
FIG. 12 is an explanatory diagram illustrating a first example of control of an aperture stop in an image pickup apparatus according to a second embodiment.
Figure 13:
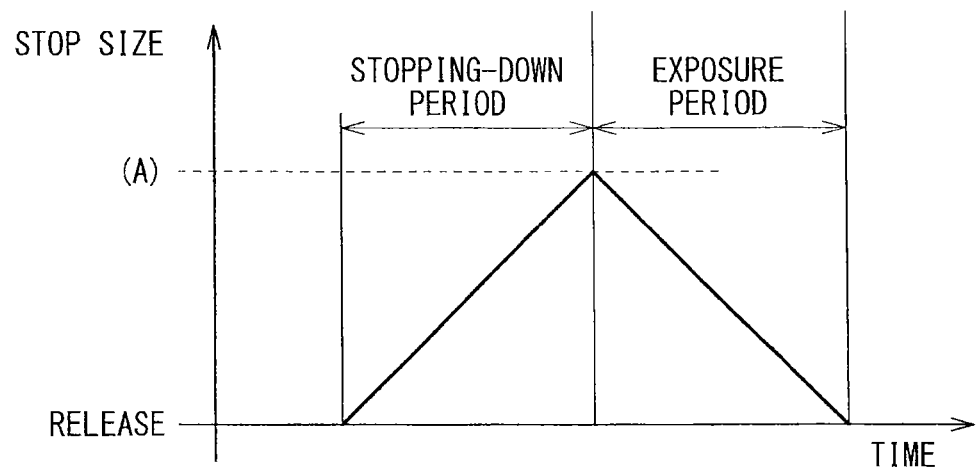
FIG. 13 is an explanatory diagram illustrating a first example of control of an aperture stop in an image pickup apparatus according to a comparative example.
Figure 14:
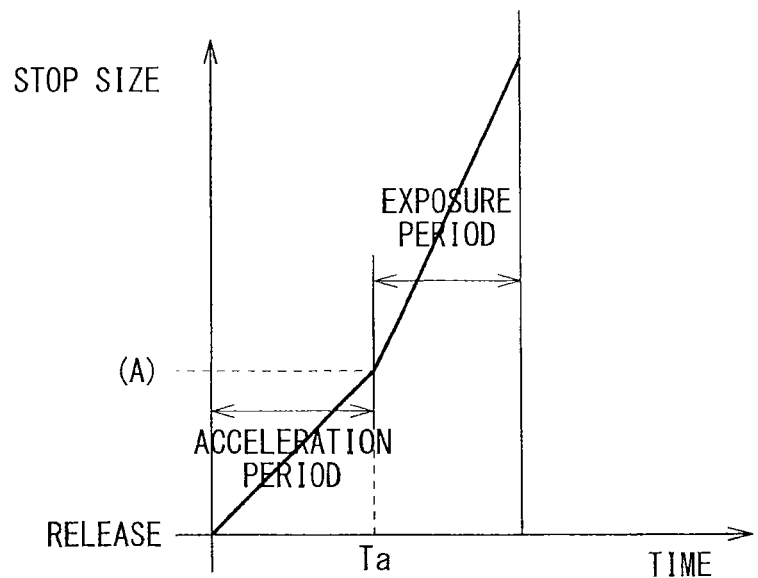
FIG. 14 is an explanatory diagram illustrating a second example of the control of the aperture stop in the image pickup apparatus according to the second embodiment.
Figure 15:
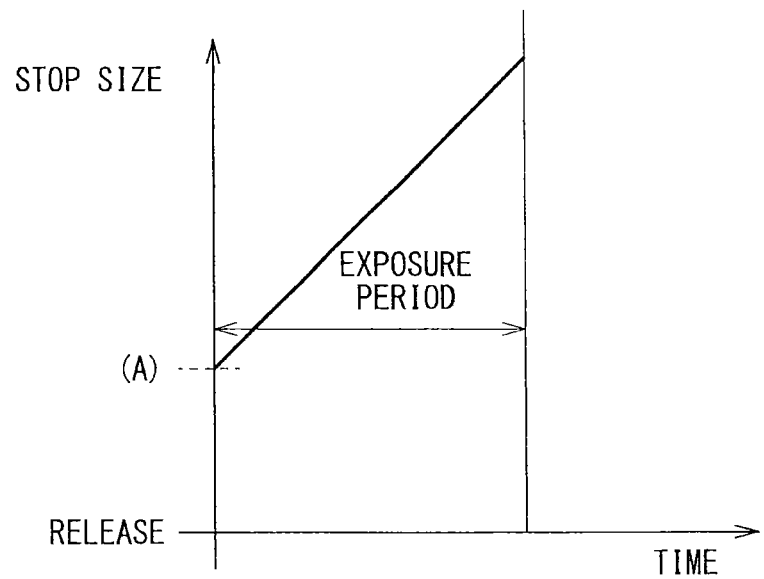
FIG. 15 is an explanatory diagram illustrating a second example of the control of the aperture stop in the image pickup apparatus according to the comparative example.

FIG. 12 illustrates a first example of control of the aperture stop 42 according to the second embodiment. FIG. 13 illustrates an example of control of the aperture stop 42 as a comparative example with respect to FIG. 12. FIG. 14 illustrates a second embodiment of the control of the aperture stop 42 according to the second embodiment. FIG. 15 illustrates an example of control of the aperture stop 42 as a comparative example with respect to FIG. 14.

In the second embodiment, the aperture-stop controller 52 drives the aperture-stop drive motor 71 to perform aperture-stop control of changing the stop size of the aperture stop 42 from the first stop size to the second stop size within an exposure period based on an exposure start timing Ta. At that time, before the exposure start timing Ta, the aperture-stop controller 52 moves the aperture stop 42 with acceleration in a direction same as a moving direction of the aperture stop 42 within the exposure period, to close the stop size of the aperture stop 42 to the first stop size.

FIG. 12 illustrates an example of a case where the second stop size in the above description is a size released more than the first stop size (A). In other words, FIG. 12 illustrates an example of a case where the moving direction of the stop size within the exposure period is a direction releasing the aperture stop. In this case, before the exposure start timing Ta, the aperture-stop controller 52 adjusts the stop size of the aperture stop 42 once to the third stop size (B) where the aperture stop is stopped down more than that at the first stop size (A) (stopping-down period in FIG. 12). After that, further, the aperture-stop controller 52 changes the stop size of the aperture stop 42 with acceleration to be close to the first stop size (A) from the third stop size (B) (acceleration period in FIG. 12). After that, the aperture-stop controller 52 changes the stop size of the aperture stop 42 from the first stop size (A) to a desired second stop size within the exposure period.

In contrast to the example of the control of FIG. 12, in the comparative example in FIG. 13, the acceleration period is omitted. In the comparative example of FIG. 13, immediately after the aperture stop 42 is stopped down to the first stop size (A) from the releasing side, the exposure period starts. In the case of such control, the exposure period starts immediately after the aperture stop 42 is moved to the first stop size (A) from a direction opposite to the moving direction of the aperture stop within the exposure period. Therefore, for example, in the aperture-stop driving system using the stepping motor, it may be difficult to accelerate the operation of the aperture stop 42 within the exposure period due to influence of inertial force and friction force of the motor. In contrast, in the example of the control of FIG. 12, since the acceleration period is provide and the aperture stop 42 is moved with acceleration in the direction same as the moving direction of the aperture stop 42 within the exposure period, it is possible to accelerate the operation of the aperture stop 42 within the subsequent exposure period.

FIG. 14 illustrates an example of a case where the second stop size in the above description is a stop size where the aperture stop is stopped down more than that at the first stop size (A). In other words, FIG. 14 illustrates an example of a case where the moving direction of the aperture stop within the exposure period is a direction stopping down the aperture stop from the releasing side. In this case, before the exposure start timing Ta, the aperture-stop controller 52 changes the stop size of the aperture stop 42 with acceleration to be close to the first stop size (A), from the stop size closer to the releasing side than the first stop size (A) (an acceleration period in FIG. 14). After that, the aperture-stop controller 52 changes the stop size of the aperture stop 42 from the first stop size (A) to the desired second stop size within the exposure period.

In contrast to the example of the control of FIG. 14, in a comparative example of FIG. 15, the acceleration period is omitted. In the comparative example of FIG. 15, the exposure period immediately starts without passing the acceleration period. Therefore, it is difficult to accelerate the operation of the aperture stop 42 within the exposure period. In contrast, in the example of FIG. 14, since the acceleration period is provided, and the aperture stop 42 is moved with acceleration in the direction same as the moving direction of the aperture stop 42 within the exposure period, it is possible to accelerate the operation of the aperture stop 42 within the subsequent exposure period.

2.2 Control Operation of Exposure Timing

Figure 16:
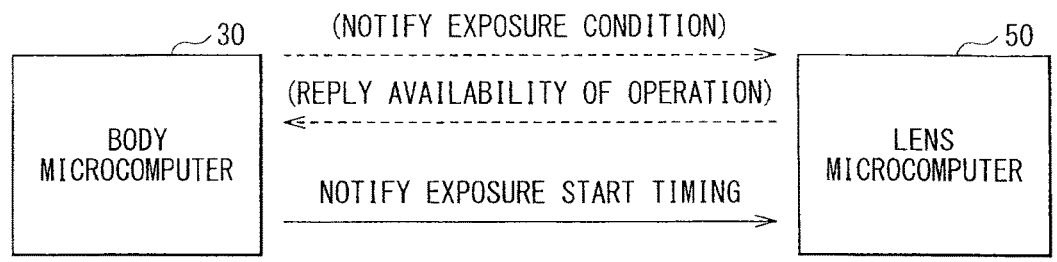
FIG. 16 is a block diagram illustrating an example of communication between a body microcomputer and a lens microcomputer in the image pickup apparatus according to the second embodiment.
Figure 17:
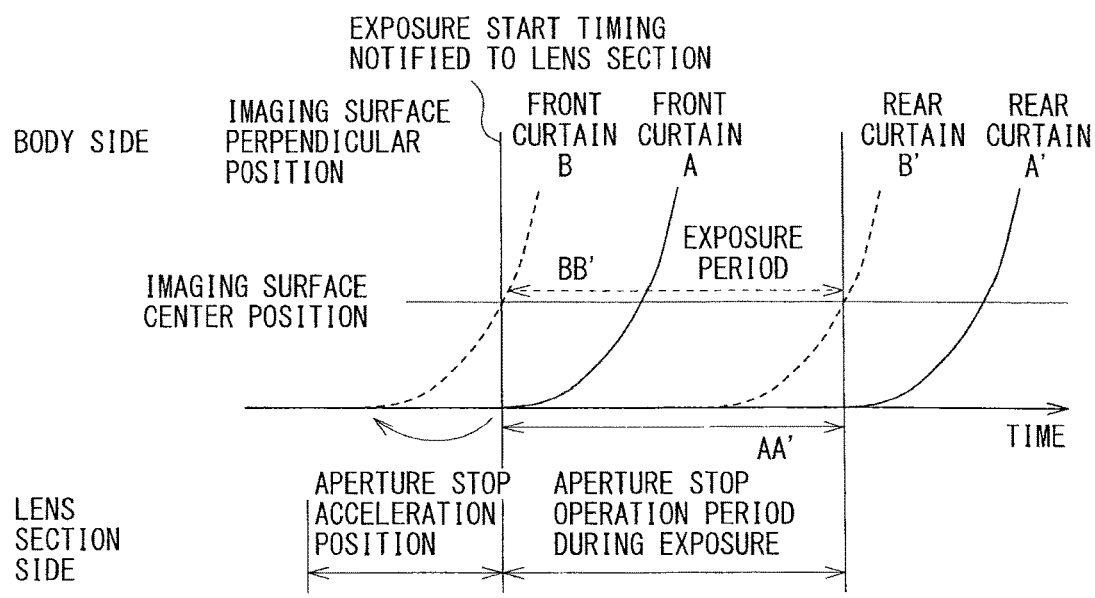
FIG. 17 is an explanatory diagram illustrating an example of control of exposure timing of the image pickup apparatus according to the second embodiment.

Subsequently, with reference to FIG. 16 and FIG. 17, the control operation of the exposure timing according to the second embodiment is described. FIG. 16 illustrates an example of communication between the body microcomputer 30 and the lens microcomputer 50 according to the second embodiment. FIG. 17 illustrates an example of control of the exposure timing according to the second embodiment.

In the case of the lens interchangeable type camera, for example, as illustrated in FIG. 2, the aperture-stop controller 52 as the aperture-stop control section is provided in the lens microcomputer 50. In addition, the exposure controller 32 and the shutter controller 33 as the exposure control section are provided in the body microcomputer 30.

In the second embodiment, the exposure control section notifies the aperture-stop controller 52 in the lens microcomputer 50 of the exposure start timing Ta with reference to a predetermined synchronization signal. In addition, the exposure control section variably controls the drive start time of the shutter 45, based on the notified exposure start timing Ta. The aperture-stop controller 52 in the lens microcomputer 50 moves the aperture stop 42 with acceleration so that the stop size is to be the first stop size (A) at the time of the exposure start timing Ta notified by the exposure control section, as the example illustrated in FIG. 12 and FIG. 14.

The example of communication between the body microcomputer 30 and the lens microcomputer 50 in performing the above-described control operation is more specifically described.

Before the shooting operation is started, a start value and an end value of an aperture-stop value varied in exposure are determined from a blurring quantity and a quantity of apodization effect. The start value and the end value may be specified by a user through the operation section 18. After half depression of the shutter release button of the operation section 18 is detected, exposure calculation is performed in consideration of variation of the aperture-stop value in exposure, to determine the shutter speed and an ISO value. Alternatively, the shutter speed or the ISO value or both may be specified by a user. After that, autofocus (AF) operation is performed. The AF operation is performed by the aperture-stop value that is available value closest to the releasing side in exposure, in order to prevent blurring of the focus plane in exposure. The AF operation may be performed with the more released aperture-stop value.

In the case of the lens interchangeable camera having the configuration illustrated in FIG. 2, after deep depression of the shutter release button is detected, the body microcomputer 30 notifies the lens microcomputer 50 of an exposure condition, as illustrated in FIG. 16. For example, as the exposure condition, an exposure time, an aperture-stop value at the exposure start, and an aperture-stop value at the exposure end may be notified.

As illustrated in FIG. 16, the lens microcomputer 50 makes a replay, to the body microcomputer 30, whether the requested operation is allowed to be performed, and an F-number necessary for acceleration, and a time necessary for acceleration. Alternatively, before the shutter release button is depressed, the lens microcomputer 50 previously notifies the body microcomputer 30 of the operable range, and the reply whether the requested operation is allowed to be performed may be omitted.

As illustrated in FIG. 16, the body microcomputer 30 notifies the lens microcomputer 50 of the exposure start timing Ta. When the lens microcomputer 50 is configured so as to perform operation in synchronization with a predetermined synchronization signal, notification is achieved by a notification method in which the exposure is started at a synchronization signal n times after the synchronization signal immediately after the notification. When the lens is configured so as to perform operation in asynchronization with the synchronization signal, a notification method in which the exposure is started after certain seconds after the synchronization signal immediately after the notification may be used.

The body microcomputer 30 matches a traveling start timing of the front curtain 46 of the shutter 45 with the synchronization signal specified as the exposure start timing Ta (in this case, the release time lag is not fastest). The front curtain traveling in this case is denoted by A in FIG. 17, and the rear curtain traveling is denoted by A' in FIG. 17.

In this case, the traveling start timing of the front curtain is shifted forward, from the specified synchronization signal, by a time between the traveling start of the front curtain 46 and reaching of the front curtain 46 to a center of the imaging surface. As a result, the time to start the exposure of the middle-region of the imaging surface is allowed to be adjusted to the aperture-stop value at the exposure start specified in the lens microcomputer 50. In addition, the time to end the exposure of the middle-region of the imaging surface is allowed to be adjusted to the aperture-stop value at the exposure end specified in the lens microcomputer 50. The front curtain traveling in this case is denoted by B in FIG. 17, and the rear curtain traveling is denoted by B' in FIG. 17. When this is used as the reference exposure size, the reference exposure size is adjusted to an arbitrary size in the vertical direction of the imaging surface by shifting the traveling start timing of the front curtain.

The lens microcomputer 50 starts the acceleration operation earlier by a tine necessary for the acceleration with reference to the specified timing of the synchronization signal, and ends the necessary acceleration operation at the specified timing of the synchronization signal. At the end of the acceleration operation, the specified aperture-stop value at the exposure start is achieved. The aperture stop is controlled by taking the specified exposure time from the synchronization signal until the specified aperture-stop value at the exposure end.

Note that, in the case of the camera having the configuration of FIG. 3, the communication with the lens microcomputer 50 is unnecessary, and the acceleration operation is started after the aperture stop is stopped down further by an amount necessary for the acceleration operation, and the necessary acceleration operation is ended. The specified aperture-stop value at the exposure start is achieved at the end of the acceleration operation. The aperture stop is controlled by taking the specified exposure time from the synchronization signal until the specified F-number at the exposure end.

2.3 Effects

As described above, according to the second embodiment, the aperture stop 42 is moved with acceleration before the exposure start timing Ta, to be closed to the initial stop size within the exposure period. Therefore, it is possible to obtain apodization effect even if the shutter speed is increased. As compared with the case where the acceleration period is not provided, the shutter speed necessary for obtaining the same apodization effect is allowed to be increased.

3. Third Embodiment

Example of Light-Emission Control 3.1 Operation of Light-Emission Control

Figure 18:
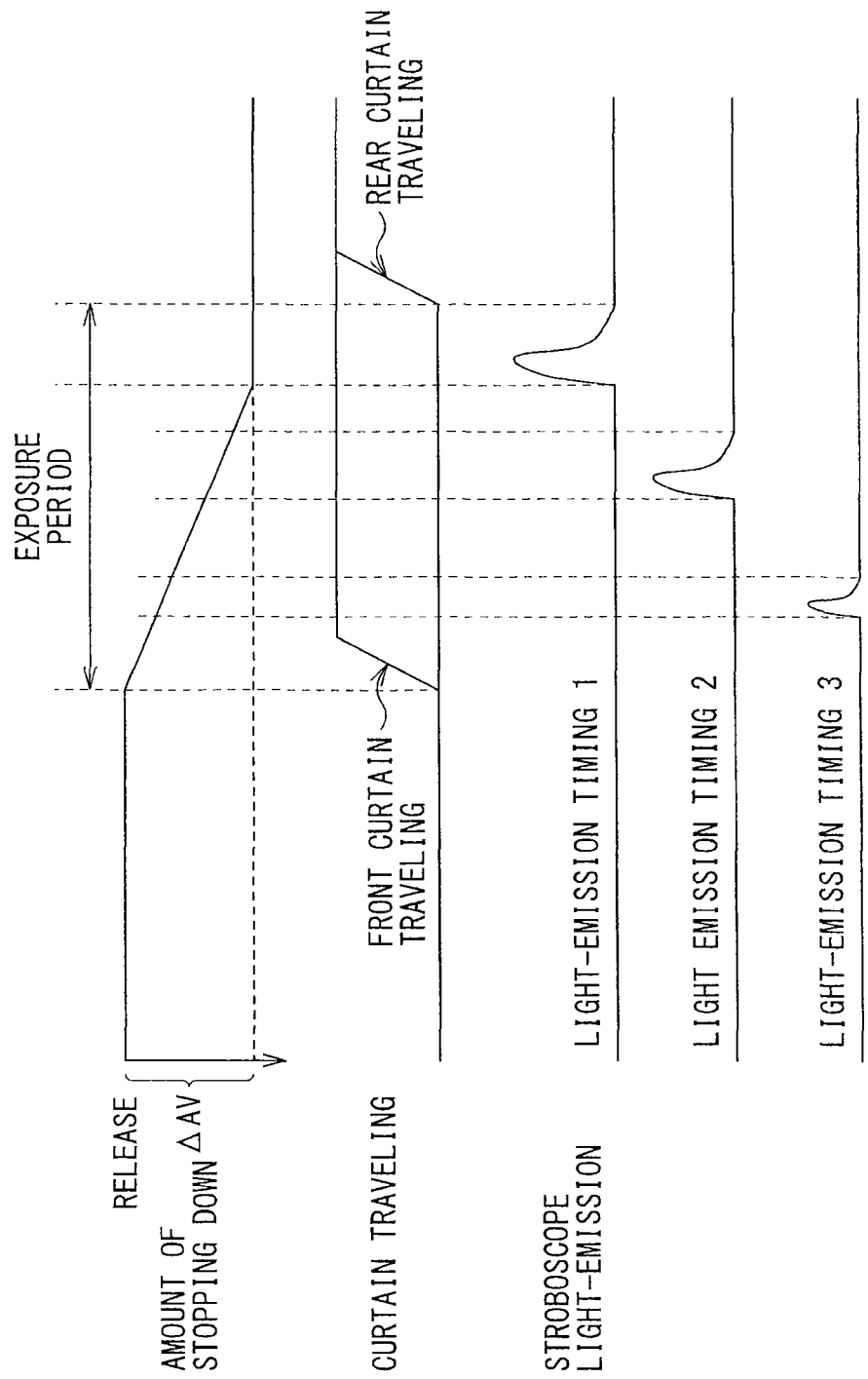
FIG. 18 is a timing chart illustrating an example of light-emission timing of a stroboscope in an image pickup apparatus according to a third embodiment.
Figure 19:
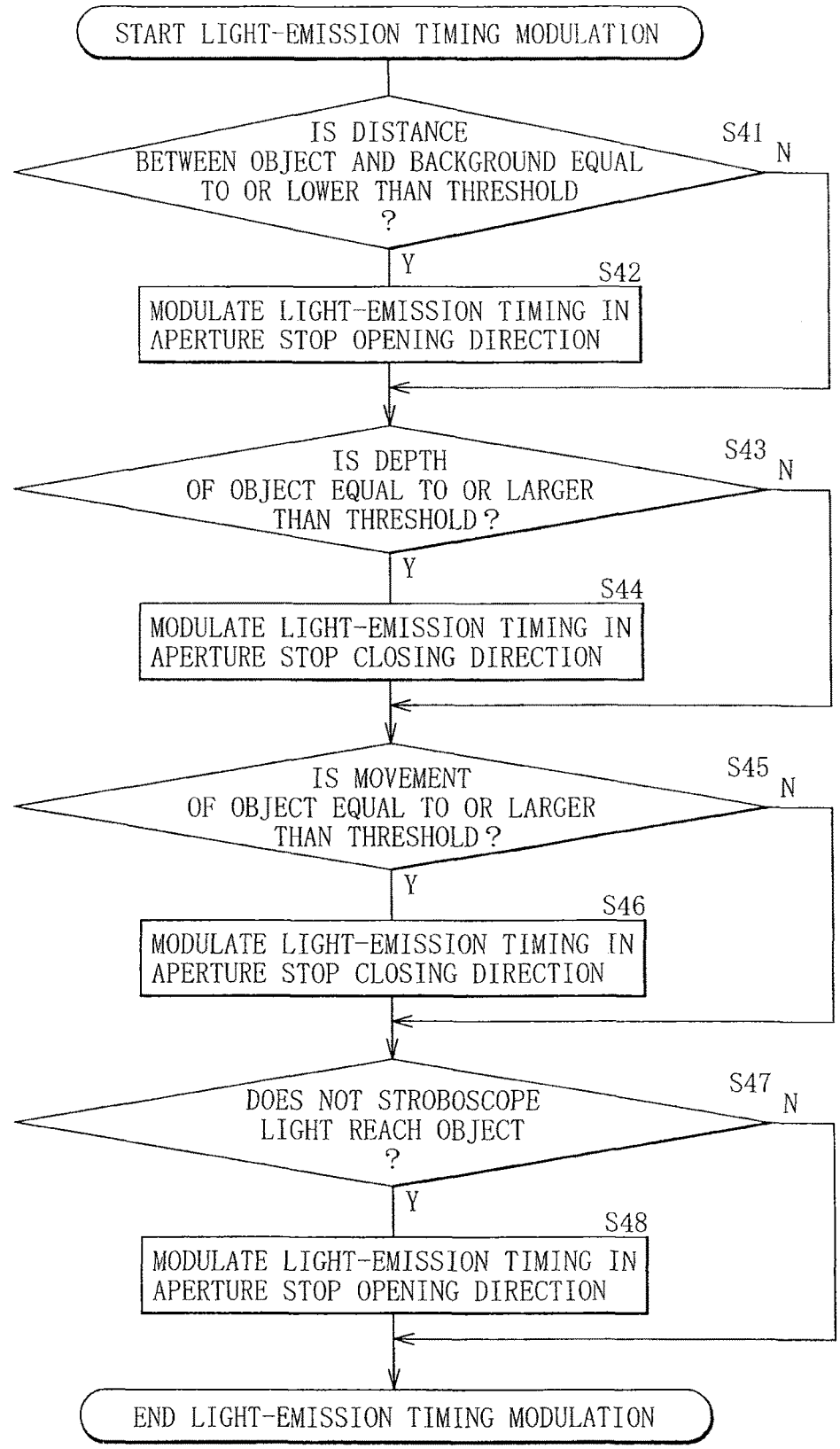
FIG. 19 is a flowchart illustrating an example of control of the light-emission timing of the stroboscope in the image pickup apparatus according to the third embodiment.

A third embodiment relates to light-emission control of the stroboscope 22. With reference to FIG. 18 and FIG. 19, operation of the light-emission control of the stroboscope 22 according to the third embodiment is described. Note that the basic configurations of the entire image pickup apparatus and the drive control section of the exposure system according to the third embodiment may be similar to those in the above-described first embodiment (FIG. 1 to FIG. 3).

FIG. 18 illustrates an example of light-emission timing of the stroboscope 22 according to the third embodiment. FIG. 19 illustrates an example of a flow of control of the light-emission timing of the stroboscope 22 according to the third embodiment. In an upper part of FIG. 18, change of the stop size of the aperture stop 42 is illustrated. In the example of FIG. 18, the aperture stop 42 is stopped down by an amount of stopping-down $\Delta AV$ from the releasing state within the exposure period. In a middle part of FIG. 18, a state of curtain traveling including a traveling state of the front curtain 46 and a traveling state of the rear curtain 47 is illustrated by assuming that the shutter 45 is a mechanical shutter of a focal plane system. In a lower part of FIG. 18, examples of the light-emission timing and a light-emission amount of the stroboscope 22 are illustrated.

As illustrated in FIG. 1, the light-emission timing of the stroboscope 22 is controlled by the light-emission control section 62. During the exposure, the aperture-stop controller 52 variably controls the aperture stop 42 between the first stop size and the second stop size where the aperture stop 42 is stopped-down more than that at the first stop size. For example, the light-emission control section 62 allows the stroboscope 22 to emit light at a first timing when the aperture stop 42 is stopped down to the second stop size within the exposure period (light-emission timing 1 in FIG. 18). When the stroboscope 22 emits light at the time of releasing the aperture stop, a depth of field of the object receiving the stroboscopic light is shallow, and thus the object is not clearly visible. When the stroboscope 22 emits light at a stopped-down timing as the light-emission timing 1 of FIG. 18, the depth of field of the object receiving the stroboscopic light is deep, and thus an image in which the object is more clearly visible is allowed to be captured.

The light-emission control section 62 may modulate the light-emission timing of the stroboscope 22 based on the shooting condition. The light-emission control section 62 determines whether the shooting condition to the object satisfies a first condition, and when the first condition is satisfied, the light-emission control section 62 may allow the stroboscope 22 to emit light at a second timing when the aperture stop 42 is released more than that at the second stop size (the light-emission timing 2 of FIG. 18). In this example, for example, as the first condition, the light-emission control section 62 may determine whether a distance between the object and its background is equal to or lower than a first distance. Moreover, for example, as the first condition, the light-emission control section 62 may determine whether a distance of the object is equal to or larger than a second distance.

When the first condition is satisfied, the light-emission control section 62 may further determine whether the shooting condition to the object satisfies a second condition, and when the second condition is satisfied, the light-emission control section 62 allows the stroboscope 22 to emit light at a third timing when the aperture stop 42 is stopped down more than that at the second timing (a light-emission timing 3 in FIG. 18). In this example, as the second condition, the light-emission control section 62 may determine whether the depth of the object is equal to or larger than the second distance. Moreover, for example, as the second condition, the light-emission control section 62 may determine whether the movement of the object is equal to or larger than predetermined movement.

When allowing the stroboscope 22 to emit light at the second timing or the third timing, the light emission control section 62 allows the stroboscope 22 to emit light so that the light-emission amount is smaller than that in the case where allowing the stroboscope 22 to emit light at the first timing. In other words, the light-emission control section 62 allows the light emission amount to be decreased as the degree of the stop down of the aperture stop is closer to the releasing side.

With reference to FIG. 19, the flow of the control in the case where the light-emission timing of the stroboscope 22 is modulated based on the shooting condition is specifically described. The light-emission timing is modulated based on the shooting condition, which allows light emission with more appropriate stop size.

An initial light-emission timing is set to a state where the aperture stop 42 is most stopped down as the light emission timing 1 of FIG. 18. The light-emission control section 62 determines whether the distance between the object and the background is equal to or lower than a predetermined threshold (step S41). When the distance between the object and the background is not equal to or lower than the predetermined threshold (step S41; N), the process proceeds to a next determination step S43. When the distance between the object and the background is equal to or lower than the predetermined threshold (step S41; Y), the light emission control section 62 modulates the light-emission timing in the releasing direction of the aperture stop (step S42). In this way, the light emission timing may be set to the releasing side rather than the initial light-emission timing (for example, the light-emission timing in FIG. 18). Accordingly, the depth of field becomes shallow, and the object becomes clearly visible.

Next, the light-emission control section 62 determines whether the depth of the object is equal to or larger than a predetermined threshold (step S43). When the depth of the object is not equal to or larger than the predetermined threshold (step S43; N), the process proceeds next determination step S45. When the depth of the object is equal to or larger than the predetermined threshold (step S43; Y), the light-emission control section 62 modulates the light-emission timing in the closing direction of the aperture stop (step S44). In this way, for example, the light-emission timing may be set to the light-emission timing 2 in FIG. 18. Accordingly, an image in focus on an entire region of the object is allowed to be captured.

Next, the light-emission control section 62 determines whether the movement of the object is equal to or larger than a predetermined threshold (step S45). When the movement of the object is not equal to or larger than the predetermined threshold (step S45; N), the process proceeds to next determination step S47. When the movement of the object is equal to or larger than the predetermined threshold (step S45; Y), the light-emission control section 62 modulates the light-emission timing in the closing direction of the aperture stop (step S46). In this way, for example, the light-emission timing may be set to the light-emission timing 1 in FIG. 18. Accordingly, focus shift caused by movement of the object is avoided.

Next, the light-emission control section 62 determines whether the stroboscopic light does not reach the object at the moment due to long distance to the object or the like (step S47). When the stroboscopic light reaches the object at the moment (step S47; N), the modulation processing is ended. When the stroboscopic light does not reach the object at the moment (step S47; Y), the light-emission control section 62 modulates the light-emission timing in the opening direction of the aperture stop (step S48). In this way, for example, the light-emission timing may be set to the light-emission timing 2 or the light-emission timing 3 in FIG. 18. The determination whether the stroboscopic light does not reach the object may be performed based on the aperture-stop value, a gain, a maximum Gno of the stroboscope 22, and the like, in addition to the distance information of the object. When the stroboscopic light does not reach the object, the light-emission timing is modulated in the opening direction of the aperture stop to control the stroboscopic light to reach the object.

Specific examples of the thresholds used in the above-described determination steps S41, S43, S45, and S47 are illustrated in Table 1. As for the shooting condition, only values of dominant items in the respective determination steps are described. The influence rate of each condition determination at the time of modulating the light-emission timing becomes smaller in the order of S47, S45, S43, and S41.

TABLE 1

| Determination step | Shooting condition | | | | | Determination threshold |
|---|---|---|---|---|---|---|
| | Effective F-number | ISO value | Flash maximum Gno | Distance of focus of lens | Distance of object | |
| S41 | F3.5 | — | — | 50 mm | 2 m | Distance between object and background: 1 m |
| S43 | F3.5 | — | — | 50 mm | 2 m | Depth of object: 50 cm |
| S45 | F3.5 | — | — | 50 mm | 2 m | Movement of object: 2.5 m/sec |
| S47 | F5.6 | ISO100 | Gno56 | — | 2 m | Distance of object: 10 m |

Moreover, a typical example of a method of obtaining information used in each determination step is described. The distance between the object and the background referenced in the determination step S41 may be obtained based on preliminary light-emission, an imaging-surface phase difference pixel, lens distance information, and the like. The depth of the object referenced in the determination step S43 may be obtained based on the preliminary light-emission, the imaging-surface phase difference pixel, and the like. The movement of the object referenced in the determination step S45 may be obtained based on the imaging-surface phase difference pixel, lens information, object recognition information, color information, edge information, motion vector, and the like. The preliminary light-emission is previous light-emission to calculate a light-emission amount for shooting. The imaging-surface phase difference pixel is a pixel provided for phase difference AF, in the image pickup device 44. Further, advantages and disadvantages by difference in distance detection method are collectively illustrated in Table 2.

TABLE 2

| Distance detection method | Advantages | Disadvantages |
|---|---|---|
| Preliminary light-emission | It has no influence on quality of picked-up image | Accuracy is deteriorated when distance of object or background is long. Accuracy is varied according to reflectance of object. |
| Imaging-surface phase difference pixel | Accuracy is high. | Accuracy is deteriorated in dark scene. It has influence on quality of picked-up image. |
| Lens distance information | It has no influence on quality of picked-up image | Accuracy is varied depending on kinds of lens. |

3.2 Effects

As described above, according to the third embodiment, the aperture stop 42 is variably controlled between the first stop size and the second stop size where the aperture stop is stopped down more than that at the first stop size, as well as the stroboscopic light-emission is performed at the first timing when the aperture stop 42 is stopped down to the second stop size. Therefore, it is possible to obtain apodization effect, and to perform stroboscopic light-emission at optimal timing. Moreover, since the timing of the stroboscopic light-emission is modulated based on the shooting condition, it is possible to perform stroboscopic light-emission at optimal timing based on the shooting condition.

4. Other Embodiments 4-1 Other Embodiment 1

Additionally, the present technology may also be configured as below.

(1) An image processing apparatus, including circuitry configured to cause an aperture diaphragm to move from a first diaphragm position to a second diaphragm position within a first exposure period, and cause the aperture diaphragm to then move from the second diaphragm position to the first diaphragm position within the first exposure period or a second exposure period. The first and second exposure periods are used to capture different images.

(2) The image processing apparatus of feature (1), in which the circuitry is further configured to determine the first exposure period.

(3) The image processing apparatus of feature (1) or (2), in which the circuitry is configured to cause the aperture diaphragm to move from the first diaphragm position to the second diaphragm position within the first exposure period, and cause the aperture diaphragm to then move from the second diaphragm position to the first diaphragm position within the second exposure period.

(4) The image processing apparatus of any of features (1) to (3), in which the circuitry is configured to cause the aperture diaphragm to alternate between the first and second diaphragm positions as an initial starting position for each of at least three exposure periods including the first and second exposure periods.

(5) The image processing apparatus of any of features (1) to (4), in which the circuitry is configured to cause the aperture diaphragm to move from the first diaphragm position to the second diaphragm position and then from the second diaphragm position to the first diaphragm position within the first exposure period.

(6) The image processing apparatus of feature (5), in which the circuitry is further configured to compare a shutter speed corresponding to the first exposure period to a predetermined threshold value, and cause the aperture diaphragm to move from the first diaphragm position to the second diaphragm position and then from the second diaphragm position to the first diaphragm position, within the first exposure period, when the shutter speed is lower than the predetermined threshold value (7) The image processing apparatus of feature (5), in which the circuitry is configured to cause the aperture diaphragm to move from the first diaphragm position to the second diaphragm position and then from the second diaphragm position to the first diaphragm position a plurality of times within the first exposure period.

(8) The image processing apparatus of any of features (1) to (7), in which the circuitry is configured to determine the first diaphragm position based on an initial position of the aperture diaphragm before the first exposure period begins.

(9) The image processing apparatus of feature (8), in which the initial position is closer to the first diaphragm position than the second diaphragm position.

(10) The image processing apparatus of feature (9), in which the initial position is between the first and second diaphragm positions.

(11) The image processing apparatus of feature (8), in which the circuitry is configured to cause the aperture diaphragm to move to the first diaphragm position before the first exposure period begins when the initial position is different from the first diaphragm position.

(12) The image processing apparatus of any of features (1) to (11), in which the circuitry is further configured to capture a plurality of images in response to depression of a shutter release button.

(13) The image processing apparatus of any of features (1) to (12), in which the first diaphragm position corresponds to an end position of a previous exposure period used to capture a previous image.

(14) The image processing apparatus of any of features (1) to (13), in which the aperture diaphragm is more open at the first diaphragm position than at the second diaphragm position.

(15) An image processing system, including circuitry configured to cause an aperture diaphragm to move from a first diaphragm position to a second diaphragm position within a first exposure period, and cause the aperture diaphragm to then move from the second diaphragm position to the first diaphragm position within the first exposure period or a second exposure period. Each of the first and second exposure periods are used to capture different images.

(16) A method of an image processing apparatus for image capture, the method including causing, by circuitry of the image processing apparatus, an aperture diaphragm to move from a first diaphragm position to a second diaphragm position within a first exposure period; and causing, by the circuitry, the aperture diaphragm to then move from the second diaphragm position to the first diaphragm position within the first exposure period or a second exposure period. The first and second exposure periods are used to capture different images.

(17) A lens, including an aperture diaphragm and circuitry. The circuitry is configured to cause the aperture diaphragm to move from a first diaphragm position to a second diaphragm position within a first exposure period, and cause the aperture diaphragm to then move from the second diaphragm position to the first diaphragm position within the first exposure period or a second exposure period. The first and second exposure periods are used to capture different images.

(18) A method of an image processing apparatus for image capture, the method includes causing, by circuitry of the image processing apparatus, an aperture diaphragm to move from a first diaphragm position to a second diaphragm position during an exposure period for capturing an image. The aperture diaphragm is positioned at an initial diaphragm position, which is close to a diaphragm end position of a previous exposure period for capturing a previous image, before the exposure period begins. The initial diaphragm position is closer to the first diaphragm position than the second diaphragm position.

(19) An image processing apparatus, including circuitry configured to cause an aperture diaphragm to move from a first diaphragm position to a second diaphragm position during an exposure period for capturing an image. The aperture diaphragm is positioned at an initial diaphragm position, which is close to a diaphragm end position of a previous exposure period for capturing a previous image, before the exposure period begins. The initial diaphragm position is closer to the first diaphragm position than the second diaphragm position.

(20) A non-transitory computer-readable storage medium storing a program, which when executed by a computer, causes the computer to perform the method of feature (16) or (18).

4-2 Other Embodiment 2

Additionally, the present technology may also be configured as below.

(1) An exposure controller including
an aperture-stop control section configured to variably control, during a time period of exposure operation in an image pickup apparatus, an aperture stop to have a stop size between a first stop size and a second stop size, wherein
the aperture-stop control section controls, during consecutive shooting in the image pickup apparatus, a mode of the aperture stop to alternate, for each frame, between a first change mode and a second change mode, the first change mode allowing the aperture stop to have the first stop size at an exposure start timing whereas allowing the aperture stop to have the second stop size at an exposure end timing, and the second change mode allowing the aperture stop to have the second stop size at the exposure start timing whereas allowing the aperture stop to have the first stop size at an exposure end timing.

(2) The exposure controller according to (1), wherein the aperture-stop control section determines, before the consecutive shooting, whether a current stop size of the aperture stop is close to either the first stop size or the second stop size, and controls, based on a determination result, the aperture stop under a first frame in the consecutive shooting to operate either in the first change mode or in the second change mode.

(3) The exposure controller according to (2), wherein the aperture-stop control section controls the aperture stop under the first frame to operate in the first change mode when the current stop size of the aperture stop before the consecutive shooting is close to the first stop size, whereas controls the aperture stop under the first frame to operate in the second change mode when the current stop size of the aperture stop before the consecutive shooting is close to the second stop size.

(4) The exposure controller according to any one of (1) to (3), wherein the aperture-stop control section allows the aperture stop to perform preliminary operation, during a shutter charging operation between frames in the image pickup apparatus, the preliminary operation allowing the size of the aperture stop to be changed.

(5) An exposure controller including
an aperture-stop control section configured to variably control, during a time period of exposure operation in an image pickup apparatus, an aperture stop to have a stop size between a first stop size and a second stop size, wherein
the aperture-stop control section controls, during a single exposure period in the image pickup apparatus, a mode of the aperture stop to alternate one or more times between a first change mode and a second change mode, the first change mode allowing the aperture stop to have the first stop size at an initial timing whereas allowing the aperture stop to have the second stop size at an end timing, and the second change mode allowing the aperture stop to have the second stop size at the initial timing whereas allowing the aperture stop to have the first stop size at the end timing.

(6) An exposure control method including:
controlling, by an aperture-stop control section, during consecutive shooting in the image pickup apparatus, a mode of the aperture stop to alternate, for each frame, between a first change mode and a second change mode;
allowing the aperture stop to have the first stop size at an exposure start timing whereas allowing the aperture stop to have the second stop size at an exposure end timing during the first change mode; and
allowing the aperture stop to have the second stop size at the exposure start timing whereas allowing the aperture stop to have the first stop size at an exposure end timing during the second change mode.

(7) An exposure control method including:
variably controlling, by an aperture-stop control section, during a single exposure period in the image pickup apparatus, a mode of the aperture stop to alternate one or more times between a first change mode and a second change mode;
allowing the aperture stop to have the first stop size at an initial timing whereas allowing the aperture stop to have the second stop size at an end timing during the first change mode; and
allowing the aperture stop to have the second stop size at the initial timing whereas allowing the aperture stop to have the first stop size at the end timing during the second change mode.

(8) An image pickup apparatus including
an aperture-stop control section configured to variably control, during a time period of exposure operation, an aperture stop to have a stop size between a first stop size and a second stop size, wherein
the aperture-stop control section controls, during consecutive shooting, a mode of the aperture stop to alternate, for each frame, between a first change mode and a second change mode, the first change mode allowing the aperture stop to have the first stop size at an exposure start timing whereas allowing the aperture stop to have the second stop size at an exposure end timing, and the second change mode allowing the aperture stop to have the second stop size at the exposure start timing whereas allowing the aperture stop to have the first stop size at an exposure end timing.

(9) An image pickup apparatus including
an aperture-stop control section configured to variably control, during a time period of exposure operation, an aperture stop to have a stop size between a first stop size and a second stop size, wherein
the aperture-stop control section controls, during a single exposure period, a mode of the aperture stop to alternate one or more times between a first change mode and a second change mode, the first change mode allowing the aperture stop to have the first stop size at an initial timing whereas allowing the aperture stop to have the second stop size at an end timing, and the second change mode allowing the aperture stop to have the second stop size at the initial timing whereas allowing the aperture stop to have the first stop size at the end timing.

It should be understood by those skilled in the art that various modifications, combinations, sub-combinations, and alterations may occur depending on design requirements and other factors insofar as they are within the scope of the appended claims or the equivalents thereof.

What is claimed is:
1. An image processing apparatus, comprising:
circuitry configured to
cause an aperture diaphragm to move from a first open diaphragm position at a start of a first exposure period to a second open diaphragm position, which is different from the first open diaphragm position, before an end of the first exposure period, and
cause the aperture diaphragm to then move from the open second diaphragm position to the first open diaphragm position before the end of the first exposure period or within a second exposure period, wherein
the first and second exposure periods are used to capture different images.

2. The image processing apparatus according to claim 1, wherein the circuitry is further configured to determine the first exposure period.

3. The image processing apparatus according to claim 1, wherein the circuitry is configured to
cause the aperture diaphragm to move from the first open diaphragm position to the second open diaphragm position within the first exposure period, and
cause the aperture diaphragm to then move from the second open diaphragm position to the first open diaphragm position within the second exposure period.

4. The image processing apparatus according to claim 1, wherein the circuitry is configured to cause the aperture diaphragm to alternate between the first and second open diaphragm positions as an initial starting position for each of at least three exposure periods including the first and second exposure periods.

5. The image processing apparatus according to claim 1, wherein the circuitry is further configured to capture a plurality of images in response to depression of a shutter release button.

6. The image processing apparatus according to claim 1, wherein the aperture diaphragm is more open at the first diaphragm position than at the second diaphragm position.

7. The image processing apparatus of claim 1, wherein the circuitry is configured to:
cause a shutter to open at the start of the first exposure period and close at the end of the first exposure period; and cause the aperture diaphragm to be at the first open diaphragm position at the start of the first exposure period and to be in the second open position at the end of the end of the first exposure period.

8. The image processing apparatus according to claim 1, wherein the circuitry is configured to determine the first diaphragm position based on an initial position of the aperture diaphragm before the first exposure period begins.

9. The image processing apparatus according to claim 8, wherein the circuitry is configured to cause the aperture diaphragm to move to the first diaphragm position before the first exposure period begins when the initial position is different from the first diaphragm position.

10. An image processing apparatus comprising:
circuitry configured to
cause an aperture diaphragm to move from a first diaphragm position to a second diaphragm position within a first exposure period; and
cause the aperture diaphragm to then move from the second diaphragm position to the first diaphragm position within the first exposure period, wherein
the first exposure period and a second exposure period are used to capture different images.

11. The image processing apparatus according to claim 10, wherein the circuitry is further configured to
compare a shutter speed corresponding to the first exposure period to a predetermined threshold value, and
cause the aperture diaphragm to move from the first diaphragm position to the second diaphragm position and then from the second diaphragm position to the first diaphragm position, within the first exposure period, when the shutter speed is lower than the predetermined threshold value.

12. The image processing apparatus according to claim 10, wherein the circuitry is configured to cause the aperture diaphragm to move from the first diaphragm position to the second diaphragm position and then from the second diaphragm position to the first diaphragm position a plurality of times within the first exposure period.

13. An image processing apparatus, comprising:
circuitry configured to
cause an aperture diaphragm to move from a first diaphragm position to a second diaphragm position within a first exposure period, and
cause the aperture diaphragm to then move from the second diaphragm position to the first diaphragm position within the first exposure period or a second exposure period, wherein
the first and second exposure periods are used to capture different images,
the circuitry is configured to determine the first diaphragm position based on an initial position of the aperture diaphragm before the first exposure period begins, and
the initial position is closer to the first diaphragm position than the second diaphragm position.

14. The image processing apparatus according to claim 13, wherein the initial position is between the first and second diaphragm positions.

15. An image processing apparatus, comprising:
circuitry configured to
cause an aperture diaphragm to move from a first diaphragm position to a second diaphragm position within a first exposure period, and
cause the aperture diaphragm to then move from the second diaphragm position to the first diaphragm position within the first exposure period or a second exposure period, wherein the first and second exposure periods are used to capture different images, and the first diaphragm position corresponds to an end position of a previous exposure period used to capture a previous image.

16. An image processing system, comprising:

circuitry configured to cause an aperture diaphragm to move from a first open diaphragm position at a start of a first exposure period to a second open diaphragm position, which is different from the first open diaphragm position, before an end of the first exposure period, and cause the aperture diaphragm to then move from the second open diaphragm position to the first open diaphragm position before the end of the first exposure period or within a second exposure period, wherein each of the first and second exposure periods are used to capture different images.

17. A method of an image processing apparatus for image capture, the method comprising:

causing, by circuitry of the image processing apparatus, an aperture diaphragm to move from a first open diaphragm position at a start of a first exposure period to a second open diaphragm position, which is different from the first open diaphragm position, before an end of the first exposure period; and causing, by the circuitry, the aperture diaphragm to then move from the second open diaphragm position to the first open diaphragm position before the end of the first exposure period or within a second exposure period, wherein the first and second exposure periods are used to capture different images.

18. A lens, comprising:

an aperture diaphragm; and circuitry configured to cause the aperture diaphragm to move from a first open diaphragm position at a start of a first exposure period to a second open diaphragm position, which is different from the first open diaphragm position, before an end of the first exposure period, and cause the aperture diaphragm to then move from the second open diaphragm position to the first open diaphragm position before the end of the first exposure period or within a second exposure period, wherein the first and second exposure periods are used to capture different images.

19. A method of an image processing apparatus for image capture, the method comprising:

causing, by circuitry of the image processing apparatus, an aperture diaphragm to move from a first open diaphragm position at a start of an exposure period for capturing an image to a second open diaphragm position, which is different from the first open diaphragm position, before an end of the exposure period, wherein the aperture diaphragm is positioned at an initial diaphragm position, which is close to a diaphragm end position of a previous exposure period for capturing a previous image, before the exposure period begins, and the initial diaphragm position is closer to the first open diaphragm position than the second open diaphragm position.

20. An image processing apparatus, comprising:

circuitry configured to cause an aperture diaphragm to move from a first open diaphragm position at a start of an exposure period for capturing an image to a second open diaphragm position, which is different from the first open diaphragm position, before an end of the exposure period, wherein the aperture diaphragm is positioned at an initial diaphragm position, which is close to a diaphragm end position of a previous exposure period for capturing a previous image, before the exposure period begins, and the initial diaphragm position is closer to the first open diaphragm position than the second open diaphragm position.

* * * * *